(12) United States Patent
Huo et al.

(10) Patent No.: US 8,577,108 B2
(45) Date of Patent: *Nov. 5, 2013

(54) METHOD FOR DETECTING ANATOMICAL STRUCTURES

(75) Inventors: Zhimin Huo, Pittsford, NY (US); Jing Zhang, HuangPu District (CN)

(73) Assignee: Carestream Health, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,394

(22) Filed: Jun. 4, 2012

(65) Prior Publication Data

US 2012/0294505 A1    Nov. 22, 2012

Related U.S. Application Data

(63) Continuation-in-part of application No. 12/190,616, filed on Aug. 13, 2008, now Pat. No. 8,189,886.

(60) Provisional application No. 61/562,453, filed on Nov. 22, 2011.

(51) Int. Cl.
G06K 9/00   (2006.01)

(52) U.S. Cl.
USPC ........................................................ 382/128

(58) Field of Classification Search
USPC ................................................ 382/128, 132
See application file for complete search history.

(56) References Cited

U.S. PATENT DOCUMENTS

| 5,610,966 | A  | 3/1997  | Martell et al.   |
|-----------|----|---------|------------------|
| 5,859,922 | A  | 1/1999  | Hoffmann         |
| 6,047,080 | A  | 4/2000  | Chen et al.      |
| 6,370,421 | B1 | 4/2002  | Williams et al.  |
| 6,690,816 | B2 | 2/2004  | Aylward et al.   |
| 6,817,982 | B2 | 11/2004 | Fritz et al.     |
| 7,116,810 | B2 | 10/2006 | Miller et al.    |
| 7,197,170 | B2 | 3/2007  | Dwyer et al.     |
| 7,611,466 | B2 | 11/2009 | Chalana et al.   |
| 7,706,859 | B2 | 4/2010  | Aizawa et al.    |
| 7,840,055 | B2 | 11/2010 | Huo              |
| 7,991,210 | B2 | 8/2011  | Peterson et al.  |
| 8,064,675 | B2 | 11/2011 | Huo              |

(Continued)

FOREIGN PATENT DOCUMENTS

WO    WO 2008/063604    5/2008

OTHER PUBLICATIONS

Tim Cootes in *Image Processing and Analysis*, Ed. R. Baldock and J. Graham, Oxford University Press, 2000, chapter entitled "Model-Based Methods in Analysis of Biomedical Images" pp. 223-248.

(Continued)

*Primary Examiner* — Rodney Fuller

(57) ABSTRACT

A method for estimating the location of an anatomical structure in an x-ray image of a patient obtains the x-ray data in digital format. The method estimates the location of at least a first benchmark feature within the x-ray image according to the obtained digital x-ray data and defines a region of interest within the image according to the estimated location of at least the first benchmark feature. A region of interest for the anatomical structure is searched using a template. The location of the anatomical structure on a display according to the template searching results is highlighted.

16 Claims, 23 Drawing Sheets

(56) References Cited

U.S. PATENT DOCUMENTS

| | | | |
|---|---|---|---|
| 8,073,229 | B2 | 12/2011 | Huo et al. |
| 8,189,886 | B2 * | 5/2012 | Huo et al. ............ 382/128 |
| 2003/0053697 | A1 | 3/2003 | Aylward et al. |
| 2003/0135115 | A1 | 7/2003 | Burdette et al. |
| 2004/0109594 | A1 | 6/2004 | Luo et al. |
| 2004/0109595 | A1 | 6/2004 | Luo et al. |
| 2005/0281447 | A1 | 12/2005 | Moreau-Gobard et al. |
| 2006/0050991 | A1 | 3/2006 | Jerebko et al. |
| 2007/0071301 | A1 | 3/2007 | Kiraly et al. |
| 2007/0237373 | A1 | 10/2007 | Kiraly et al. |
| 2008/0015590 | A1 | 1/2008 | Sanders et al. |
| 2008/0039715 | A1 | 2/2008 | Wilson et al. |
| 2008/0075345 | A1 | 3/2008 | Unal et al. |
| 2008/0292169 | A1 | 11/2008 | Wang et al. |

OTHER PUBLICATIONS

Zhimin Huo, et al., "Computer-Aided Detection of Tubes and Lines in Portable Chest X-Ray Images," Computer Assisted Radiology and Surgery (CARS)m Jun. 27-30, 2007, pp. S370-S372, XP002526333.

Subhasis Chaudhuri, et al., "Detection of Blood Vessels in Retinal Images Using Two-Dimensional Matched Filters," IEEE Transactions on Medical Imaging, IEEE Service Center, vol. 8, No. 3, Sep. 1, 1989, pp. 263-269, XP000053817.

Phan Trans Ho Truc, et al., "A New Approach to Vessel Enhancement in Angiography Images," Complex Medical Engineering, 2007, IEEE/ICME International Conference, May 1, 2007, pp. 878-884, XP031160059.

Thinh V. Nguyen, et al., "Computing the Skeleton of Coronary Arteries in Cineangiograms," Computers and Biomedical Research, Academic Press, London, GB, vol. 19, No. 5, Oct. 1, 1986, pp. 428-444, XP022956044.

European Search Report dated May 4, 2009 for European Patent Application No. 09000944.0 filed on Jan. 3, 2009, 3 pages.

Petr Dokládal, et al., "Liver Blood Vessel Extraction by a 3-D Topological Approach," MICCAI '99, Proceedings of the $2^{nd}$ International Conference on Medical Image Computing and Computer Assisted InterventionsLNCS, 1679, pp. 98-105, 1999.

Aaron K. Shackelford, et al., "Fully Automated Road Network Extraction from High-Resolution Satellite Multispectral Imagery," IEEE, 2003, pp. 461-463.

Iching Liu, et al., "Recursive Tracking of Vascular Networks in Angiograms Based on the Detection-Deletion Scheme," IEEE Transactions on Medical Imaging, vol. 12, No. 2, Jun. 1993, pp. 334-341.

Dee Method: Endotracheal Tubes: Alternative Method for Locating Carina, Interpretation of the ICU Chest Film, University of Virginia, 1999 (http://www.med-ed.virginia.edu/courses/rad/chest/lines_ett4.htm) printed Aug. 12, 2011, 1 page.

Ramesh Jain, et al., *Machine Vision*, McGraw-Hill, Inc., 1995, Chapter 6, pp. 186-233.

Calvin F. Nodine et al., "Observer Performance in the Localization of Tubes and Catheters on Digital Chest Images: The Role of Expertise and Image Enhancement," Academic Radiology, vol. 3, No. 10, Oct. 1, 1996, pp. 834-841, XP005306278.

J. Illingworth et al., "A Survey of the Hough Transform," Computer Vision Graphics and image Processign, Academic Press, vol. 44, No. 1, Oct. 1, 1988, pp. 87-116, XP000008809.

Steffen Weiss et al., "Ein Verfahren zur sicheren Visualisierung and Lokalisierung von Kathertern für MR-geführte intravaskuläre Prozeduren," Zeitschrift Fuer Medizinische Physik, Urban Und Fischer, vol. 13, No. 3, Jan. 1, 2003, pp. 172-176, XP009027858.

* cited by examiner

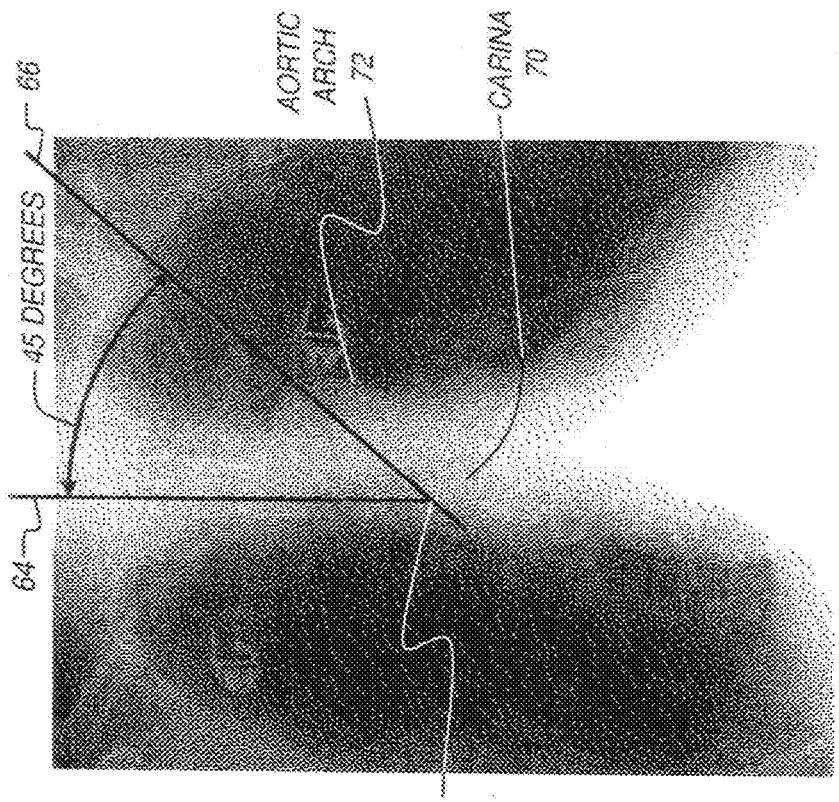
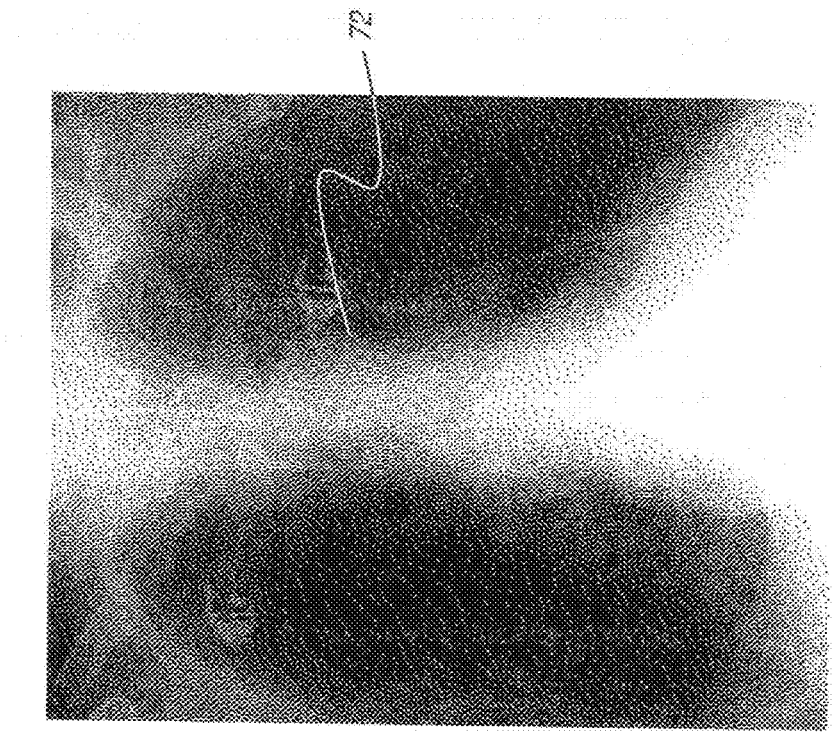
FIG. 4B
FIG. 4A

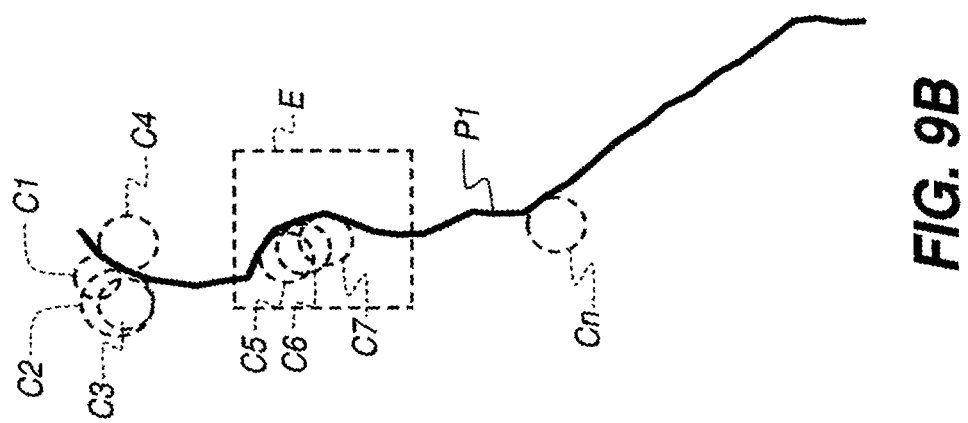

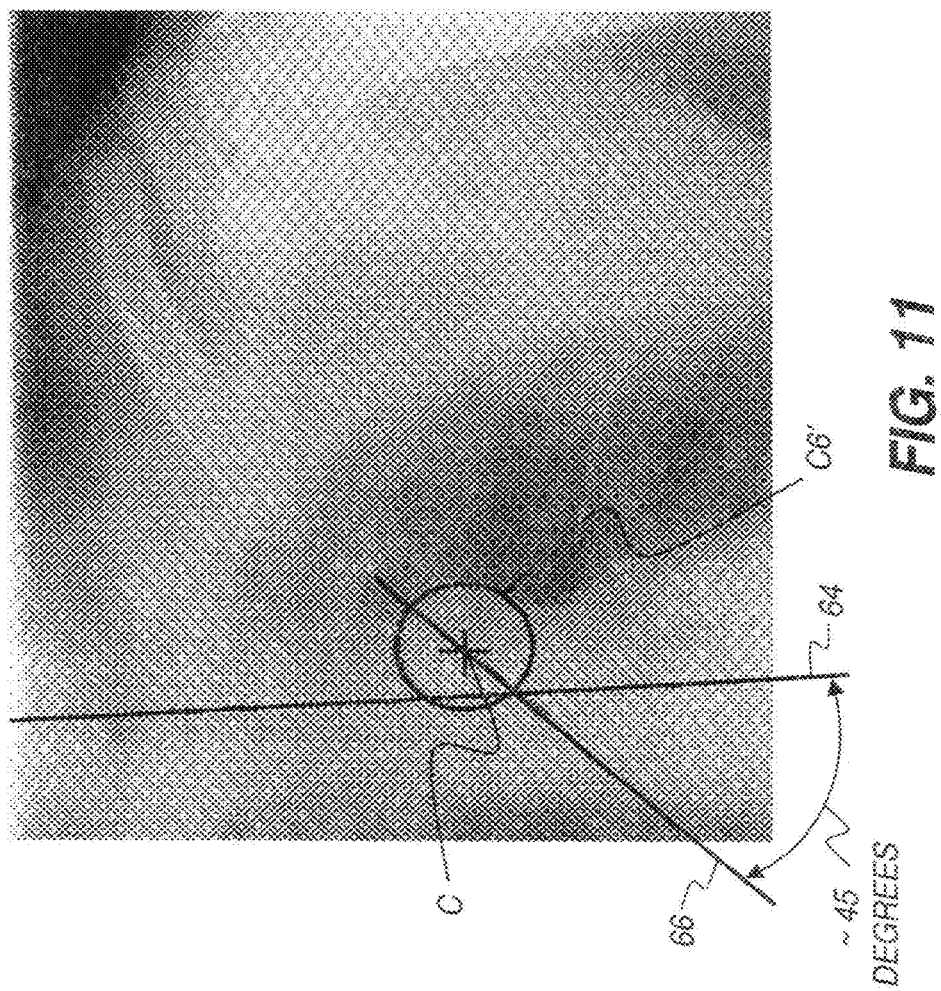

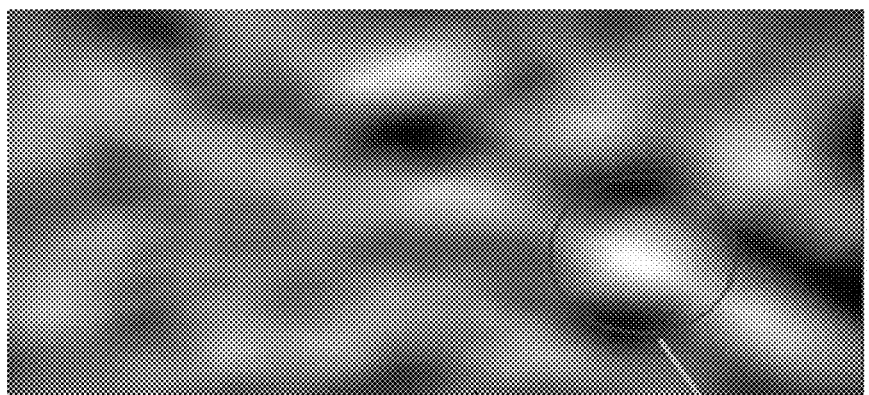
*FIG. 13D*
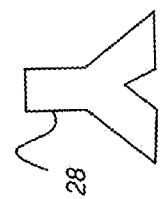
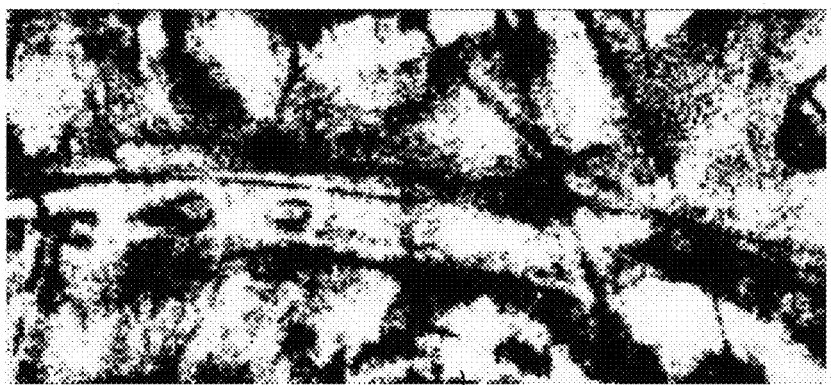
*FIG. 13C*

METHOD FOR DETECTING ANATOMICAL STRUCTURES

CROSS REFERENCE TO RELATED APPLICATIONS

This application claims priority to U.S. Provisional Patent Application 61/562,453 filed Nov. 22, 2011 in the names of Huo et al. incorporated herein by reference in its entirety.

This application is a Continuation-in-Part of U.S. Ser. No. 12/190,616 entitled METHOD FOR DETECTING ANATOMICAL STRUCTURES by Zhirnin Huo, filed on Aug. 13, 2008, which issued on May 29, 2012 as U.S. Pat. No. 8,189,886, incorporated herein by reference in its entirety.

FIELD OF THE INVENTION

This invention generally relates to analysis of diagnostic images and more particularly relates to detecting the location of the carina in a chest x-ray.

BACKGROUND

Clinical evaluation of patients in an Intensive Care Unit (ICU) often relies on diagnostic images, such as portable chest radiographic images, for example. It has been noted that chest radiographs can be helpful in the ICU for indicating significant or unexpected conditions requiring changes in patient management. To meet the need for readily accessible and rapid diagnostic imaging, equipment such as portable chest radiography equipment has been developed, allowing the ICU clinician to conveniently obtain a radiographic image as needed for the patient.

Patient treatment includes the ability to detect the proper positioning of the tip of a tube that has been inserted into the patient. Possible tube types include, for example, endo-tracheal (ET) tubes, feeding (FT) tubes, and nasogastric tubes (NGT or NT). Proper tip positioning can help to insure delivery or disposal of liquids and gases to and from the patient during a treatment procedure. Improper tip positioning, on the other hand, can cause patient discomfort, or render a treatment ineffective.

Detecting proper ET tube position using automated image analysis tools has proved to be challenging. Some suggest that a preferred position of the ET tube within the trachea is approximately 3-4 cm above the carina trachea that lies between the openings of the right and left principal bronchi. Flexion and extension of the patient's neck can result in ET tip migration and malpositioning. When the ET tube is malpositioned within a mainstem bronchus, complete atelectasis of the contralateral lung is likely, accompanied by difficulties with mechanical ventilation. When the ET tube is malpositioned within the superior trachea, there is a risk of accidental extubation and vocal cord injury. According to one study, ET tube malpositioning occurs in approximately 15% of patients. The use of routine post-intubation chest radiography has been recommended for detection of ET tube malpositioning for which clinical diagnosis is unreliable, since it is often difficult to identify specific pulmonary complications on the basis of clinical examination alone.

Detection and identification of ET tube tip positioning can be achieved when the carina is accurately identified. However, the carina is often masked by other details of surrounding anatomy, so that it can be difficult to detect the carina visually in a chest x-ray. Automated detection can be challenging; techniques for computer-assisted carina detection have proved to be error-prone and often less accurate than desirable, making tube and tip malpositioning difficult to detect in some cases.

Thus, there is a need for a detection method with improved accuracy for locating internal structures such as the carina in a digital radiographic image.

SUMMARY

The present disclosure addresses improved detection of the carina and other structures in digital radiographic images. The present disclosure provides a method for estimating the location of an anatomical structure in a diagnostic image of a patient, comprising: obtaining the x-ray data in digital format; detecting a first benchmark feature within the x-ray image; detecting a second benchmark feature within the x-ray image; locating an intersection between a first line that extends along the length of the first benchmark feature and a second line that extends through a central point related to the curvature of the second benchmark feature and that intersects with the first line at an angle that is within a predetermined range of angles; identifying the location of the anatomical structure relative to the intersection; and displaying the identified location.

It is a feature of at least one embodiment of the present disclosure that it uses the locations of trachea and aortic arch structures as benchmarks for locating the carina.

It is an advantage of at least one embodiment of the present disclosure that it uses more readily identifiable surrounding structures for locating a more difficult anatomical structure.

According to at least one embodiment of the present disclosure there is provided a method for estimating the location of an anatomical structure in an x-ray image of a patient, comprising: obtaining the x-ray data in digital format; estimating the location of at least a first benchmark feature within the x-ray image according to the obtained digital x-ray data; defining a region of interest within the image according to the estimated location of at least the first benchmark feature; searching the region of interest for the anatomical structure using a template; and highlighting the location of the anatomical structure on a display according to the template searching results.

These and other aspects, objects, features and advantages of the present disclosure will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present disclosure, it is believed that the disclosure will be better understood from the following description when taken in conjunction with the accompanying drawings.

FIGS. 4A and 4B are example radiographic images showing how aortic arch and trachea detection can be used to locate the carina.

FIGS. 9B and 9C show the process of defining candidates for arc fitting and clustering.

FIG. 11 is a plan view that shows the use of construction lines traced through two identified anatomical structures for locating a third anatomical structure.

FIGS. 13A-13D and 14 show templates in accordance with the present disclosure.

DETAILED DESCRIPTION

Figure 1:
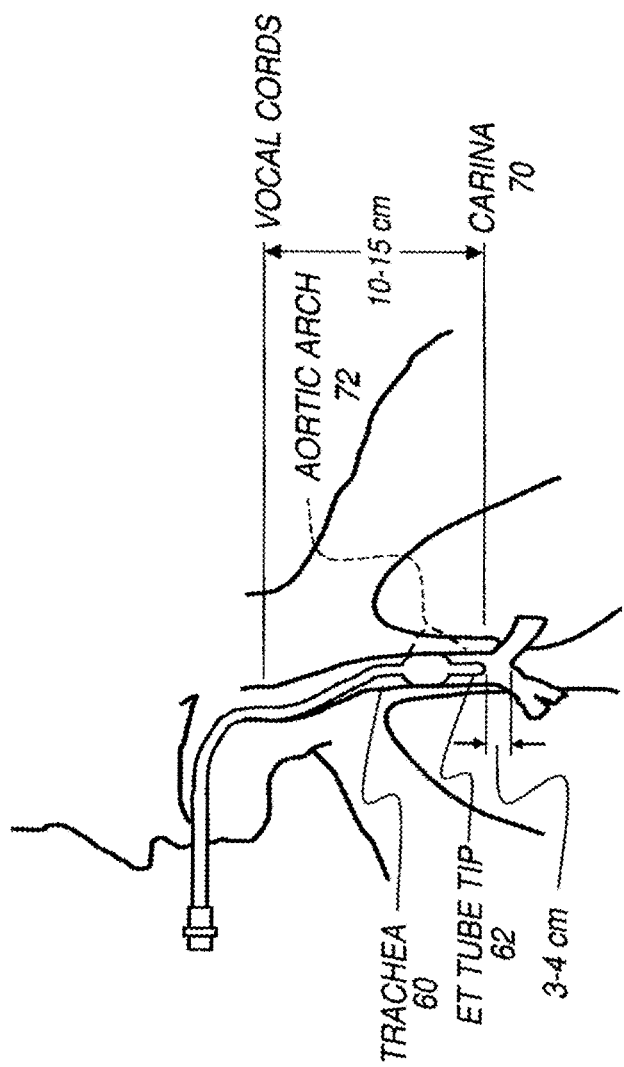
FIG. 1 is a schematic diagram showing spatial relationships and dimensions for ET tube positioning in a patient.

It is to be understood that elements not specifically shown or described in this description may take various forms well known to those skilled in the art. The sequence of steps of the present disclosure are executed by a computer or other type of control logic processor that is capable of handling the required amount of image data and that is programmed with appropriate instructions for image analysis and the requisite decision-making. This control logic processor may be provided as part of conventional image processing and display system hardware or may be provided by dedicated hardware or software that accepts and processes input images.

The term "highlighting" for a displayed feature has its conventional meaning as is understood to those skilled in the information and image display arts. In general, highlighting uses some form of localized display enhancement to attract the attention of the viewer. Highlighting a portion of an image, such as an individual organ, bone, or structure, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

The description that follows focuses on carina detection for detecting ET tube placement in a chest x-ray as one example of the method of the present disclosure. It can be appreciated that similar steps would apply for detection of tips for other types of anatomical structures in other types of x-ray or other diagnostic images, with the necessary adaptation for surrounding anatomy and other features in the diagnostic image.

In the context of the present disclosure, a feature or shape within a diagnostic image is considered as substantially linear if it exhibits little or no curvature, so that any center of curvature for a curve that is fitted to the contour of the linear feature or shape would lie outside the boundary of the image and any radius of curvature for a curve fitted to the substantially linear shape would exceed the width of the diagnostic image.

In the clinical setting, it is recognized that merely detecting the path of a tube and its tip in an x-ray or other type of diagnostic image is not sufficient for determining whether or not the tubing device is able to perform its function. For the attending medical personnel, it is desired to ascertain that the tip of a tube is at the proper position relative to the patient's anatomy. The method of the present disclosure takes this into account and provides the attending medical staff with a probabilistic assessment of tip positioning suitability for the particular patient. Embodiments of the present disclosure then expand upon this particular application to apply the method of the present disclosure to the broader problem of detecting other types of anatomical structure.

The diagram of FIG. 1 shows anatomical structures and dimensions of interest for determining proper positioning of an ET tube tip 62 within the trachea 60 of a patient, relative to the carina 70. One characteristic that is addressed in various embodiments of the present disclosure is the close proximity of the aortic arch, visible within a radiographic image near the curved dashed line indicated at 72 in FIG. 1.

Figure 2:
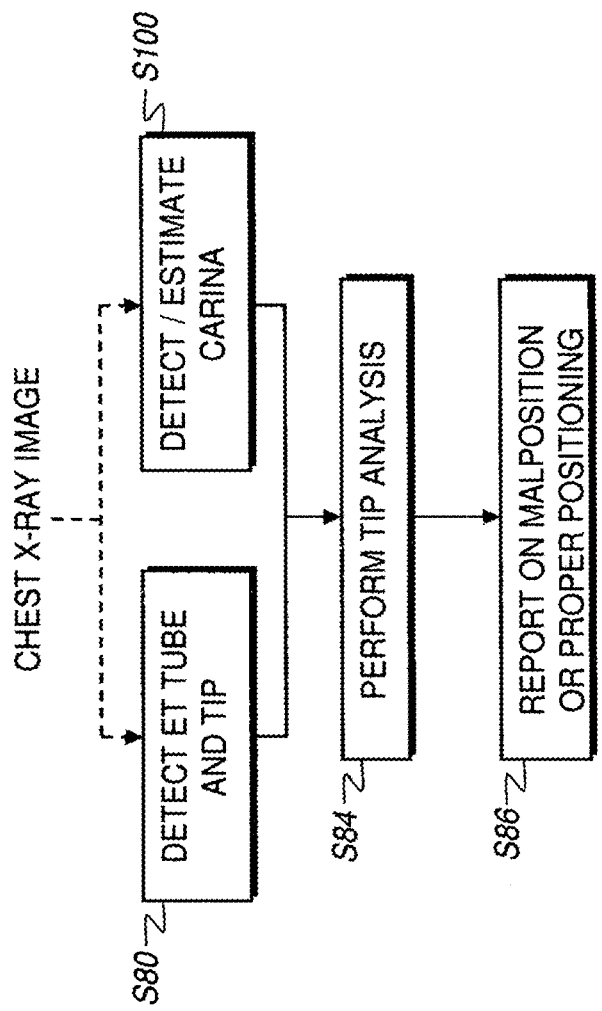
FIG. 2 is a logic flow diagram showing the overall process for detecting the position of ET tubing within a patient.

The logic flow diagram of FIG. 2 shows stages in determining proper tip and tube position in a chest x-ray image, using the anatomical structures and other physical features shown in FIG. 1. In a tube and tip detection step S80, the image is analyzed to determine the path of the ET tube and the location of its tip 62. Image processing for step S80 can use, for example, procedures described in U.S. Pat. No. 7,840,055 (Huo) and U.S. Pat. No. 8,064,675 (Huo), both incorporated herein in their entirety by reference. A carina estimation process S100 can use, for example, procedures described in U.S. Pat. No. 8,073,229 (Huo), incorporated herein in its entirety by reference. Carina estimation process S100, described in more detail subsequently, also operates on chest x-ray image data in order to detect the position of the carina. A tip analysis step S84 then determines the distance between tip 62 of the ET tube and carina 70. Given this data, a position analysis step S86 can then report on proper or improper tube tip positioning, such as by issuing an alert in the event that malpositioning is detected. Position analysis step S86 can use a variety of tools and techniques, including a training database in applications that "teach" the program to correctly identify tube position.

Carina estimation process S100 can be implemented in various ways. In one embodiment, results of actual carina detection and estimated carina location, as described herein, can be compared and used together in order to more accurately locate the carina position within an image. For example, the results of two separate algorithms can be compared against each other, wherein a first algorithm locates an anatomical structure according to its identifiable characteristics and a second algorithm provides a more probabilistic estimate of structure location based on detectable characteristics of surrounding anatomical features and other structures.

Embodiments of the present disclosure utilize various geometric relationships between two or more "benchmark" anatomical or other features, such as a spine or detected ET tube, for example, that have been shown to be useful for estimating the location of a desired anatomical structure that can be more difficult to detect in the image data. These embodiments operate by identifying the benchmark features and then forming "construction lines" according to their detected shapes, wherein a relationship between the construction lines, such as a given angular relationship, is a convenient tool for estimating the location of other anatomical structures. In the example embodiment described herein, the intersection of the construction lines then locates a point that approximates the location of a particular anatomical structure or that can be used to more accurately estimate the position of the anatomical structure. For embodiments of the present disclosure, trachea 60 and aortic arch 72 (FIG. 1) serve as benchmark features that can be identified with some accuracy and are then used to help estimate carina 70 location.

Estimating Carina Location

Embodiments of the present disclosure locate two benchmark features, the trachea and the aortic arch, from a chest x-ray image and use their relative geometrical relationship in order to obtain an estimate for position of the carina. This result can then be used with other image analysis and presentation tools that display the x-ray image and particularly with utilities for detection and display of ET tube and tube tip positioning, as described earlier with reference to FIG. 2.

Figure 3:
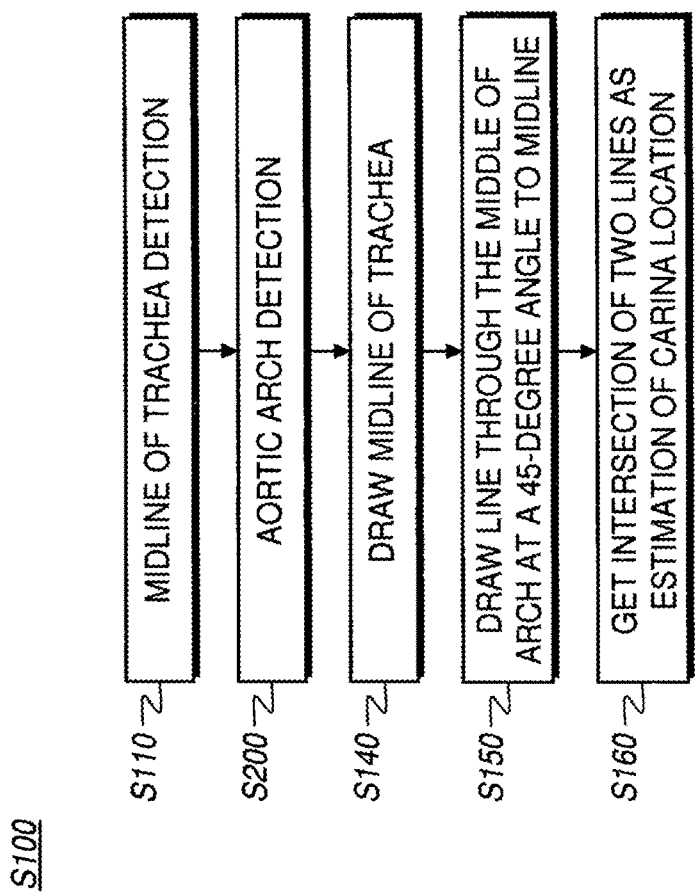
FIG. 3 is a logic flow diagram that shows the overall sequence for carina location using aortic arch and trachea detection in one embodiment of the present disclosure.

As noted in the Background, desired ET tube placement is within a given distance relative to the position of carina 70 (FIG. 1). The logic flow diagram of FIG. 3 shows the sequence of steps used to estimate carina location from a chest x-ray in one embodiment of carina estimation process S100 of the present disclosure. A trachea detection step S110 detects the trachea and detects the location of the ET tube and tip. This step may use, for example, the tube and tip detection method disclosed in commonly assigned copending applications U.S. Pat. No. 7,840,055 entitled "Computer-Aided Tube and Tip Detection" and U.S. Ser. No. 11/942,021 entitled "Image Analysis Of Tube Tip Positioning", noted earlier. Trachea detection may also interpolate trachea position from the position of the ET tube, where this has been detected. The position of the spine can alternately be used as a benchmark feature or guide to trachea location. Further, for images with an inserted ET tube, the detected ET tube or a portion of the detected ET tube, for example, the top 30%-50% of the detected ET tube, can be used alternatively as a benchmark feature or as a guide to trachea location. An aortic arch detection step S200 is then executed for identifying distinctive characteristics of the aortic arch, as a second benchmark, in the radiographic image. Aortic arch detection step S200, introduced in FIG. 3, is described in more detail subsequently.

Continuing with the sequence of FIG. 3, and referring to the example image shown in FIGS. 4A and 4B, once aortic arch 72 (FIG. 1) and trachea 60 have been detected, two tracing steps are executed, forming two intersecting construction lines 64 and 66 in order to estimate the location of carina 70. A midline tracing step S140 generates first construction line 64 using the trachea or another appropriate linear feature that lies at least substantially parallel to the trachea. In one embodiment, in which the trachea itself can be detected, step S140 generates first construction line 64 along the length and through the middle of the trachea. Alternately, first construction line 64 can be extended using other features as a guide, such as along the length and through the detected ET tube that is within the trachea or along the detected spine that is at least substantially parallel to the trachea. An angle detection step S150, using aortic arch 72 as a second detected feature, then traces second construction line 66 from a central point related to a radius of curvature of aortic arch 72, and at an angle of about 45 degrees from first construction line 64. The intersection of construction lines 64 and 66 then provides an estimate of carina 70 proximity that has been shown empirically to have a high level of accuracy. Any of the construction lines, aortic arch or other features can be highlighted on the display as a visual guide to the accuracy of the detection algorithm.

Detecting the Aortic Arch

As shown in the block diagram of FIG. 3 and example of FIGS. 4A and 4B, detection of aortic arch 72 is useful for locating the carina in embodiments of the present disclosure. The use of aortic arch 72 as a geometric reference feature requires a suitable approach for its accurate detection. As shown in FIGS. 4A and 4B, aortic arch 72 is visible in the x-ray along the inner edge of the left lung. It should be noted that, since an x-ray is being viewed, the left lung appears at the right side in the radiographic image.

Figure 5:
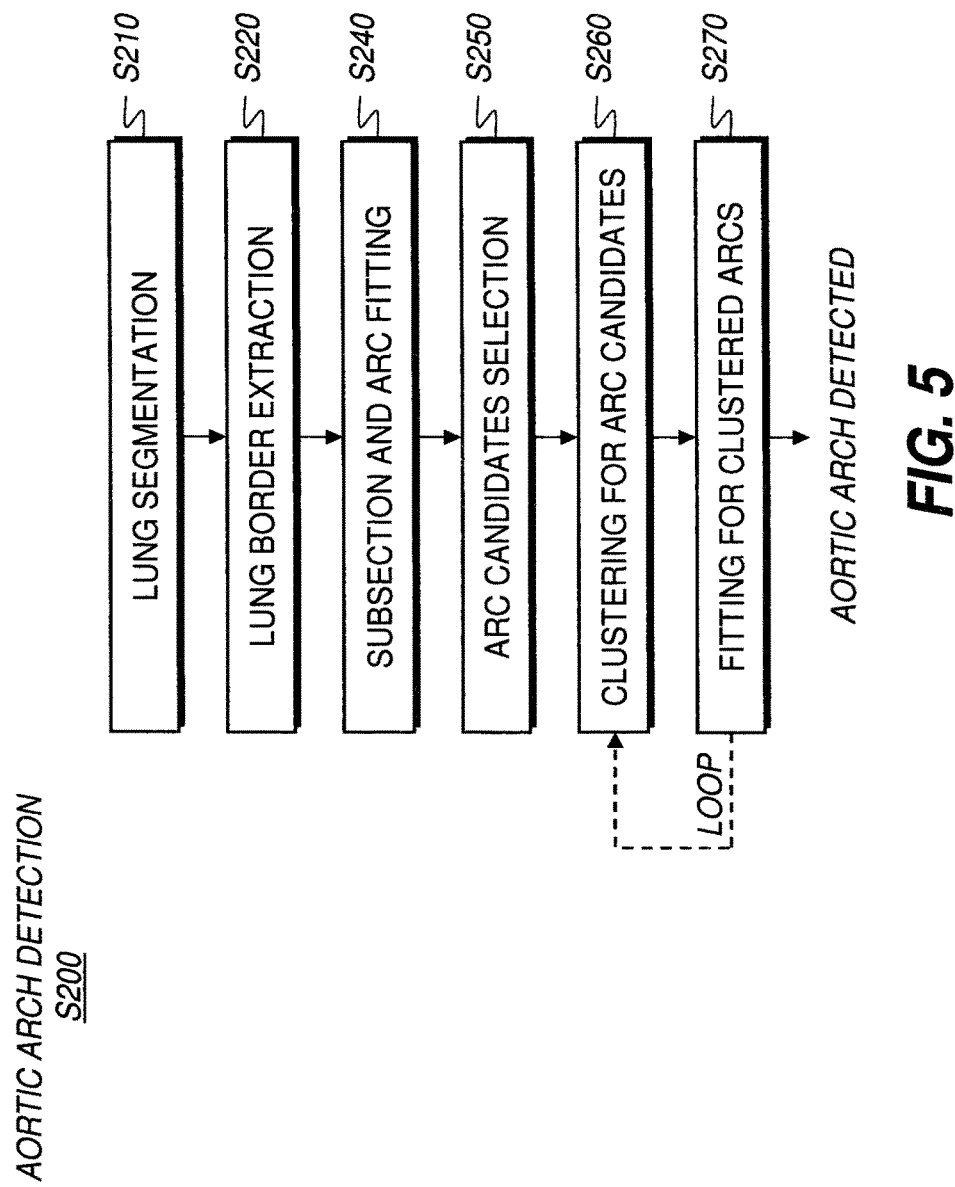
FIG. 5 is a logic flow diagram of the sequence for aortic arch detection.
Figure 6:
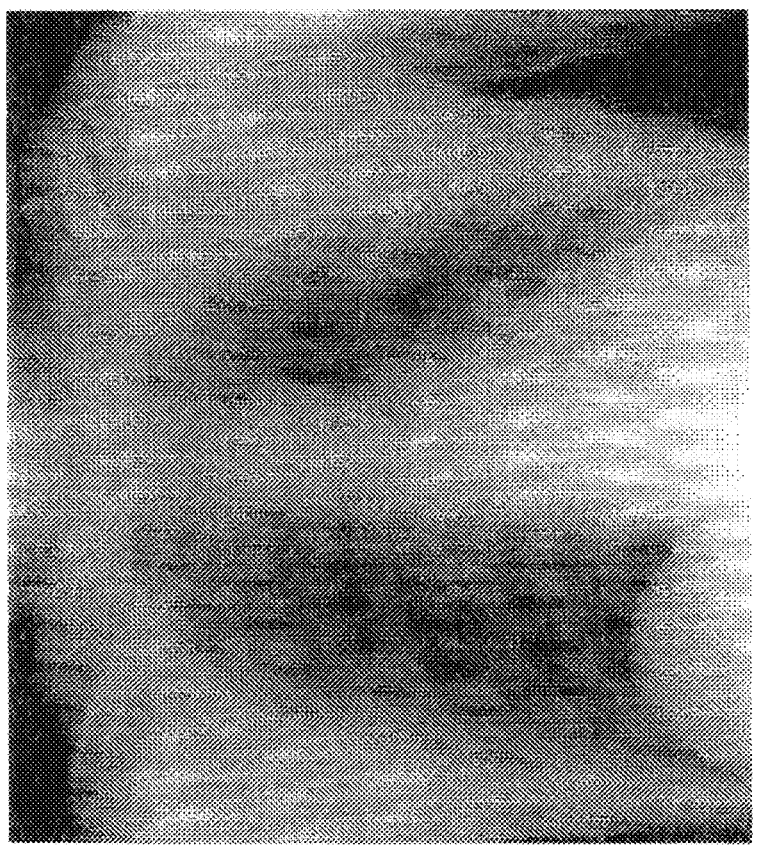
FIG. 6 is a plan view of an original radiograph for a patient having an inserted ET tube.

The block diagram of FIG. 5 shows the sequence of steps used for aortic arch detection step S200 in one embodiment of the present disclosure. Subsequent FIG. 6 and following illustrate the various steps of this sequence. FIG. 6 shows the original x-ray image prior to aortic arch or carina estimation. It can be appreciated that the carina itself would be very difficult to detect in the image shown in FIG. 6.

Figure 7:
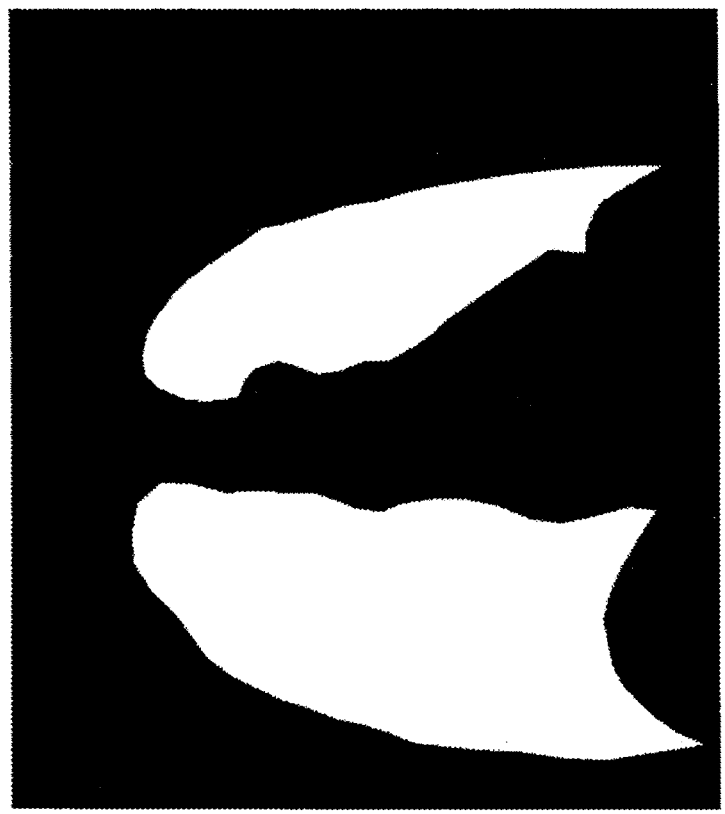
FIG. 7 is a plan view showing a mask formed for lung segmentation in an example embodiment.

Referring to FIG. 5, a lung segmentation step S210 obtains a lung mask by analyzing the image content. FIG. 7 shows a lung mask 50 as generated from analysis of the image of FIG. 6. In one embodiment, thresholding is used as a straightforward technique to form the outline of mask 50. Density values above (that is, darker than) a threshold value are considered to be background values. Further image processing operations such as erosion and dilation are used to remove holes and smooth and define the area and outline of mask 50 more completely. Alternately, more complex tools, such as an Active Shape Model (ASM) technique, known to those skilled in the image processing arts, could be used for lung segmentation step S210. ASM methods are described, for example, by Tim Cootes in *Image Processing and Analysis*, Ed. R. Baldock and J. Graham, Oxford University Press, 2000, in the chapter entitled "Model-Based Methods in Analysis of Biomedical Images" pages 223-248. Mask 50 formed in this step can then be used to segment the lungs from other structures in the x-ray image and thus simplify and streamline subsequent processing. Other types of masks could be used, applying techniques familiar to those skilled in defining regions of interest (ROIs) in diagnostic images.

Still following the flow of FIG. 5, a lung border extraction step S220 follows. For this step, utilities such as Canny edge detection are used to identify lung edges, providing edge extraction as shown in the example of a lung edge image 58 in FIG. 8.

Figure 8:
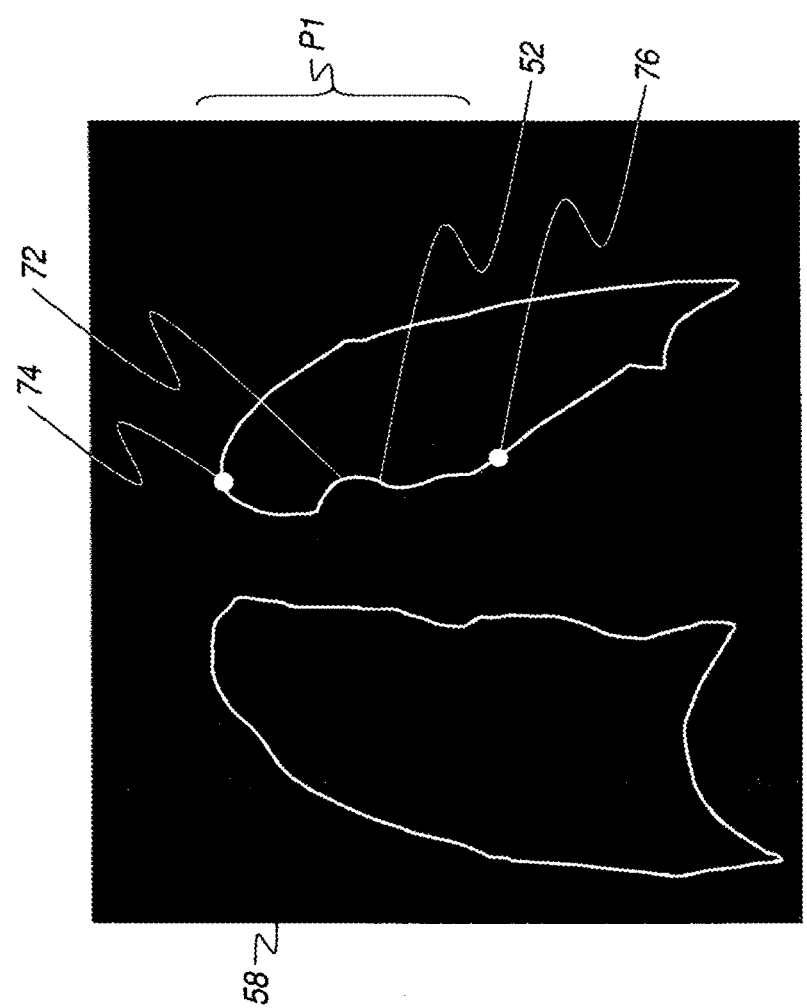
FIG. 8 is a plan view that shows extraction of the lung border from the original image.

With the lung border extracted as shown in FIG. 8, aortic arch 72 is most readily detected at a position along an inner (left) edge 52 of the left lung. Again, it should be noted that, as it appears in the x-ray, this is the left edge of the lung that appears on the right. In an inner-edge subsection and arc-fitting step S240, inner (left) edge 52 of the left lung is located and processed in order to identify arc segments of circles that map to the curvature or contour of aortic arch 72.

In one embodiment, inner-edge subsection and arc-fitting step S240 uses the following sequence for processing lung edge image 58:

(i) Set the length of a subsection to be a predetermined value of L pixels. In one embodiment, L=20.

(ii) Scan an upper portion P1, such as the top half from point 74 to point 76 in FIG. 8, of lung edge image 58 to obtain the first row and successive rows of pixels that contain the inner (left) lung edge 52.

(iii) Obtain and store successive segments of inner (left) lung edge 52, each of length L, except for the last segment that may have length≤L. Do this beginning at starting-point 74 and progressively moving toward ending-point 76 in units of L pixels. Value L is sized so that only small segments of lung edge 52 are obtained.

Figure 9A:
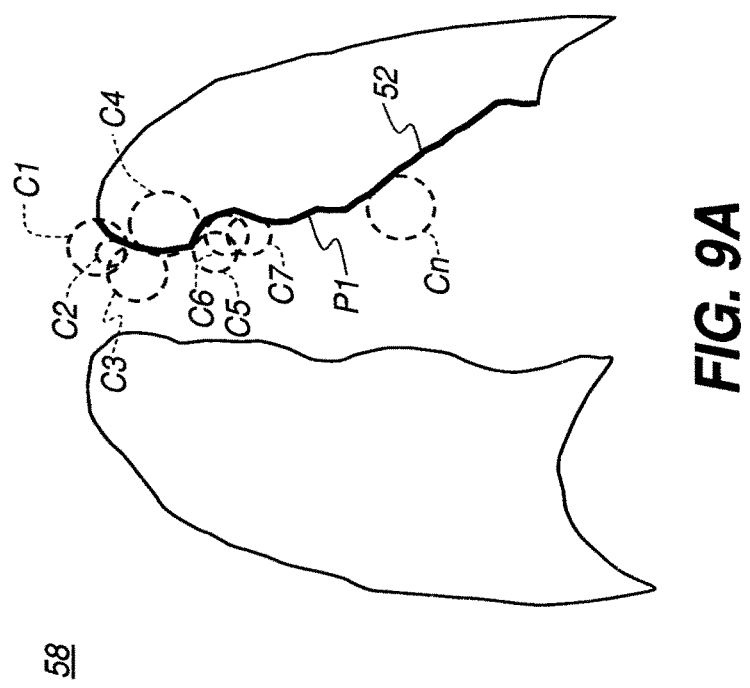
FIG. 9A is a plan view showing arc fitting used for aortic arch detection in one embodiment of the present disclosure.

Referring again to the logic flow diagram of FIG. 5, arc fitting is next executed as part of step 240 for each successive segment that was stored as a subsection. FIG. 9A shows what this processing intends to achieve. For every curved segment of inner lung edge 52 consisting of a set of discrete points $\{x_i, y_i\}$, i=1, 2, . . . , n, (where n=L) this process attempts to fit an arc to that segment and to identify the circle containing that arc. This is equivalent to calculating a circle represented by $(x_0, y_0, R)$ to minimize the objective function:

$$F = \sum_{i=1}^{n} ((x_i - x_0)^2 + (y_i - y_0)^2 - R^2)^2.$$

This gives a set of values $(x_0, y_0, R)$ and a corresponding value of objective function F for each subsection. Because aortic arch 72 has a distinctive curvature associated with an arc from a circle along the inner (left) side, that is, outside the lung field, only arcs related to circles from this side are of interest when using this iterative technique. Arcs and circles that are formed along the outer (right) side, within the lung field such as circle C4 in the example of FIG. 9A, can be ignored for this processing.

As shown in FIG. 9A, a number of circles labeled C1, C2, C3, . . . Cn are formed as the succession of arcs of an upper portion P1 of inner (left) edge 52 are traced. Portion P1 is shown enlarged in FIG. 9B, with circles C1-Cn that were generated for matching curvature along the top part of this outlined portion.

Referring again to the logic flow diagram of FIG. 5, an arc candidate selection step S250 executes. For detection of the aortic arch, the following substeps are used in one embodiment:

(i) Select each arc whose corresponding circle lies outside the lung field. In the example of FIG. 9B, this includes arcs associated with circles C1, C2, C3, C5, C6, C7, and Cn.

(ii) Validate if the arc is acceptable according to size by using predetermined thresholds for arc radius $R_{max}$ and $\epsilon$.

If radius $R<R_{max}$ and $F<\epsilon R^2$, select it as a candidate.

Values of $R_{max}$ and $\epsilon$ can be increased for fitting larger arcs in subsequent iterations of these substeps.

The next step in the sequence of FIG. 5 is an arc candidates clustering step S260. As part of this step, arc circle candidates that were considered acceptable in preceding step S250 are grouped according to location and other factors. Clusters of arcs that are adjacent or very near each other can be grouped to redefine the shape of left edge 52.

Figure 9C:
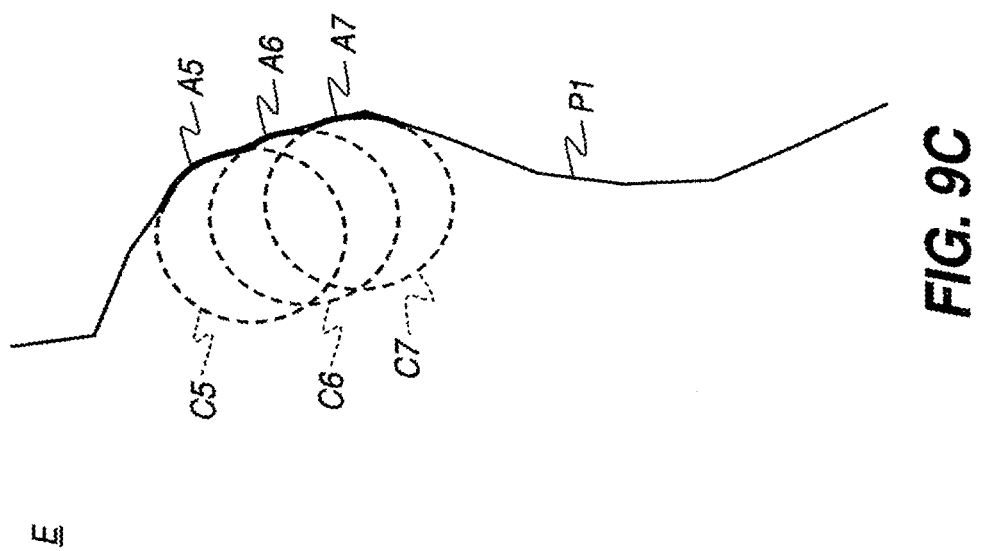

By way of example, FIG. 9B shows a grouping or cluster of arcs C5, C6, and C7 outlined in an area E that is enlarged in the view of FIG. 9C. Here, circles C5, C6, and C7 have corresponding arcs A5, A6, and A7 that can be fitted to upper portion P1. Fitting arcs A5, A6, and A7 to this curvature forms a fitted curvature that can then be used iteratively in one or more additional fitting operations as part of clustering step S260. An arc fitting step S270 then fits clustered arcs meeting acceptability criteria, related to relative size and proximity to other arcs, to the curvature of upper portion P1. In one embodiment, for example, arcs whose corresponding circles overlap or whose centers are within a predetermined distance of each other are clustered.

As indicated by the dashed line in FIG. 5, clustering step S260 and arc fitting step 270 can then optionally be repeated one or more times, each iteration providing a fitted edge formed by successive arcs. Arc-fitting methods for shape detection are well known to those skilled in the image analysis arts.

With one or more repeated iterations, each successive iteration working with larger arc radii, this processing is capable of identifying the contour of the aortic arch as a benchmark feature for subsequent detection of the carina. False positives are readily detected and can then be removed, due to their relative position along upper portion P1 and the relative radius of a fitted circle For the example shown in FIG. 9D, fitted circle C6' appears to have the correct size and positional characteristics for the contour of the aortic arch. Arc fitting with successive iterations can help to speed subsequent processing for aortic arch detection and to improve overall detection accuracy.

Figure 10B:
FIGS. 10A and 10B are plan views of templates of different radii used for detecting a circular feature in one embodiment.
Figure 10A:

As an alternative, template matching to a segment of a circular disk with predetermined radius similar to the size of aortic arch can be used to detect the aortic arch in the region along the inner border of the left lung. FIGS. 10A and 10B show representative disk segments of different radii used as templates for this purpose. In an embodiment, for example, templates vary over a range of different radii values or the radius value of a template is increased for each in a series of detection and matching operations in order to locate the aortic arch.

Another alternative for fitting a shape to a curved anatomical feature, polynomial fitting techniques could be used, as is well-known to those skilled in the image analysis arts. Polynomial fitting methods could also be combined with arc detection and fitting techniques such as those described with reference to FIGS. 9A-9D.

Forming Construction Lines

Figure 9D:
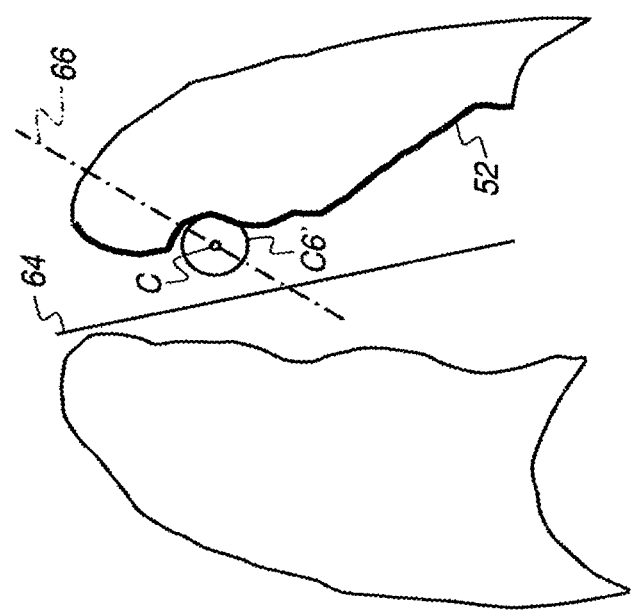
FIG. 9D shows how construction lines are formed using the trachea and aortic arch detection of embodiments of the present disclosure.

The circle that identifies the aortic arch, shown as circle C6' in the examples of FIG. 9D, and in FIG. 11, is then useful for detection of the carina. Referring to FIGS. 9D and 11, once the circle having the appropriate radius and location for the aortic arch is obtained, construction lines 64 and 66 can be traced, as was described earlier with respect to FIG. 4B. Construction line 66 extends through a central point related to the curvature of the aortic arch, such as the center C of circle C6' in the example of FIG. 9D, for example, or some other central point used as a reference for a curved surface, and intersects construction line 64 at the middle of the trachea at an angle within a predetermined range. For carina detection, these lines intersect substantially at a 45 degree angle, that is, at an angle between 54 and 36 degrees, more preferably between 50 and 40 degrees, and most preferably as close to 45 degrees as possible. Carina 70 lies generally along the midline of the trachea that is marked by construction line 64 and is estimated to be at, or very near, the intersection of construction lines 64 and 66, as was shown in FIG. 4B. Alternately, construction line 64 can align with the trachea and be approximately centered within the trachea; this is the case, for example, in an embodiment that uses the spine as a feature for obtaining line 64.

By using a combination that detects and traces the midline of the trachea and detects the aortic arch as benchmark features, the method of the present disclosure provides a more accurate way to locate the less visible carina than is provided using conventional image processing methods that employ only pattern detection, thereby improving the performance of image processing logic that senses ET tubing and tube tip position.

FIG. 11 shows an example in which both construction lines 64 and 66 are highlighted on a display, such as on a high-resolution display visible to the technician or radiologist. Any or all of the lines or other structures that are used to locate portions of the anatomy may be displayed and highlighted to the observer, such as one or both construction lines 64 and 66, circle C6', center C, or other structure.

The general principles that are used in this detection processing, tracing construction lines that extend through portions of more readily identifiable benchmark features and considering their intersection or other suitable relationship between them, can be used to solve similar imaging problems for locating other types of internal anatomical structures. In the particular case of ET tubing, the trachea provides a useful reference anatomic feature whose length-wise midpoint can be identified with sufficient accuracy using conventional image analysis techniques. Extending a length-wise construction line through its middle portion enables a base, benchmark, or reference datum to be established using this feature. This is particularly useful in this example, because the carina itself is located along that same line that extends down the middle of the trachea. An appropriate shift in this location may be used where the spine is used as a linear guide for forming construction line 64.

It can be appreciated that the methods of the present disclosure can provide an estimate of location of an anatomical structure such as the carina. However, due to factors such as patient size and positioning, such an estimate may not be sufficiently accurate in each case. Some amount of additional fine-tuning may be useful, beginning with these results. This may include further image processing, for example.

Accurate estimation of the carina location depends on the accuracy of detection for the aortic arch and centerline. Because of the variation in patient positioning in a chest x-ray image, particularly an image obtained using a portable imaging apparatus in an ICU environment, it can be challenging to provide an estimation that is suitable for subsequent analysis, such as an estimate that accurately reports the distance between the tip of endotracheal tube (ETT) and the carina. This distance can be used to determine if an ETT is properly positioned, for example. Addressing this problem helps to detect and report ETT mal-positioning, a condition which, if not detected, could be life threatening.

Further embodiments of the present disclosure improve upon methods that employ anatomical benchmarks, such as trachea and aortic arch detection, by applying template matching to results from anatomy detection. This combination of methods helps to reduce the number of false positives and to provide improved detection accuracy.

Template matching alone can provide disappointing results when applied to the full chest x-ray image or even to a smaller region that has structures that may resemble the carina. Template matching techniques are more sensitive to structure variation and can yield false-positives due to vertebrae or other anatomy and due to foreign objects. Further, the signal strength of the carina is relatively weak compared with noise structures in the image. The performance is also affected when the trachea is positioned away from a central line, or when image quality is poor. Embodiments of the present disclosure help to improve template matching performance by constraining the area over which template-matching is applied.

Figure 12:
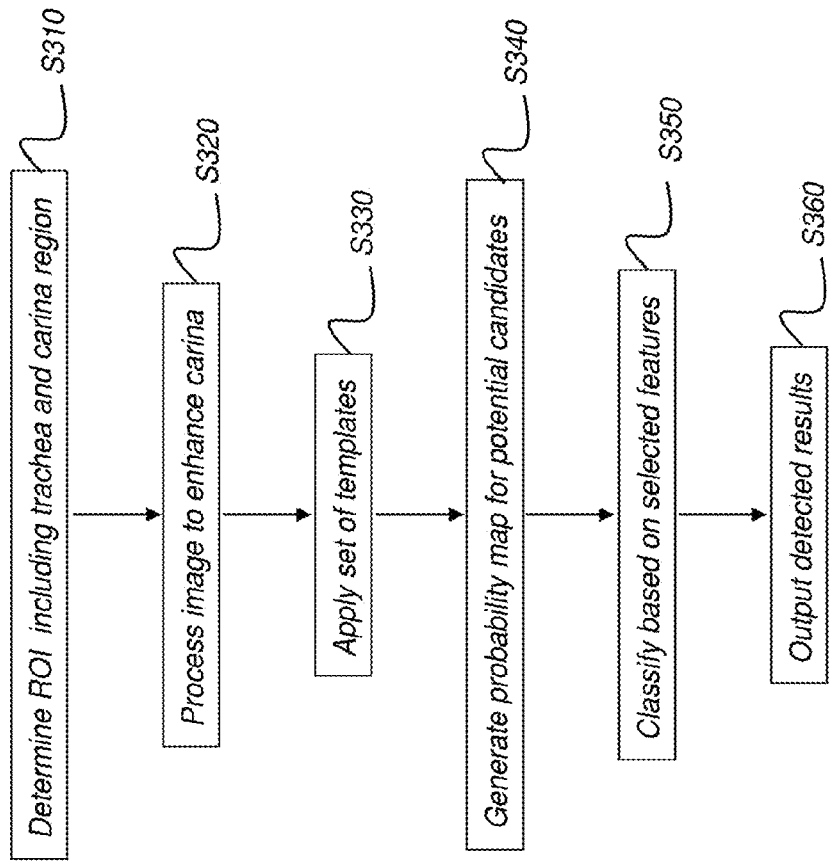
FIG. 12 shows a flowchart for a template marching technique.
Figure 13B:
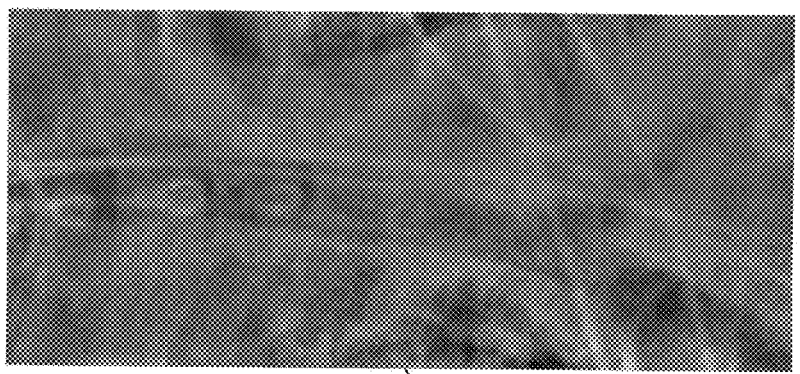
Figure 13A:
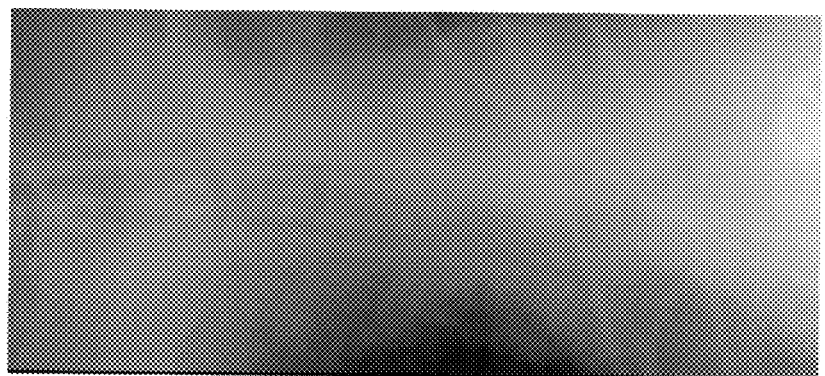

The logic flow diagram of FIG. 12 and supporting examples given in FIGS. 13A-13D show how template matching is integrated into the method using trachea and aortic arch detection. In an ROI determination step S310, trachea and aortic arch detection is used to estimate the location of the carina and thus provide a reference point for an initial region of interest 20. With initial region of interest 20 defined, centered around or near the estimated location of the carina, a processing step S320 then generates an enhanced image 22 with improved contrast for more positive identification of the carina. Further processing can be provided to generate a binary image 24 that is used with a template 28 in a template application step S330. A probability map generation step S340 and classification step S350 evaluate template matching results and help to identify the most accurate results according to patient anatomy. An output step S360 then records and displays results from this carina detection sequence, as shown by a marker 30 in an image 26 in FIG. 13D.

Figure 14:
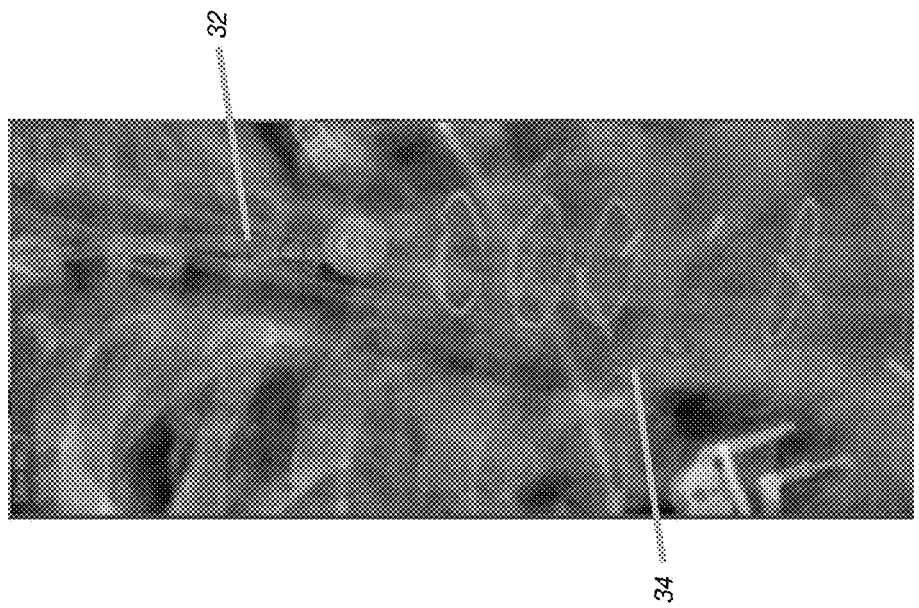

FIG. 14 shows an example portion of a chest x-ray image in which template matching has been applied without using the ROI locating methods of the present disclosure. In this example, unaided template matching yields one false-positive 32 and one true positive 34. Embodiments of the present disclosure utilize one or more anatomical benchmarks or other benchmarks and combine this image processing with template matching to help improve detection and reduce the likelihood of false positives, such as that shown as false positive 32.

The logic flow diagram of FIG. 12 uses carina estimation, obtained from estimating the location of aortic arch and trachea benchmarks, to identify an ROI. This process helps to constrain the area over which template matching is used. This can help to provide more efficient template-matching operation, but is not the only approach that can be used. In an alternate embodiment, template-matching is performed first. Then, if there is a discrepancy, or if it proves difficult to determine which of two or three possible locations is the correct one, carina estimation using trachea and aortic arch identification may be used to provide benchmark anatomy data to help resolve the ambiguity.

Figure 15:
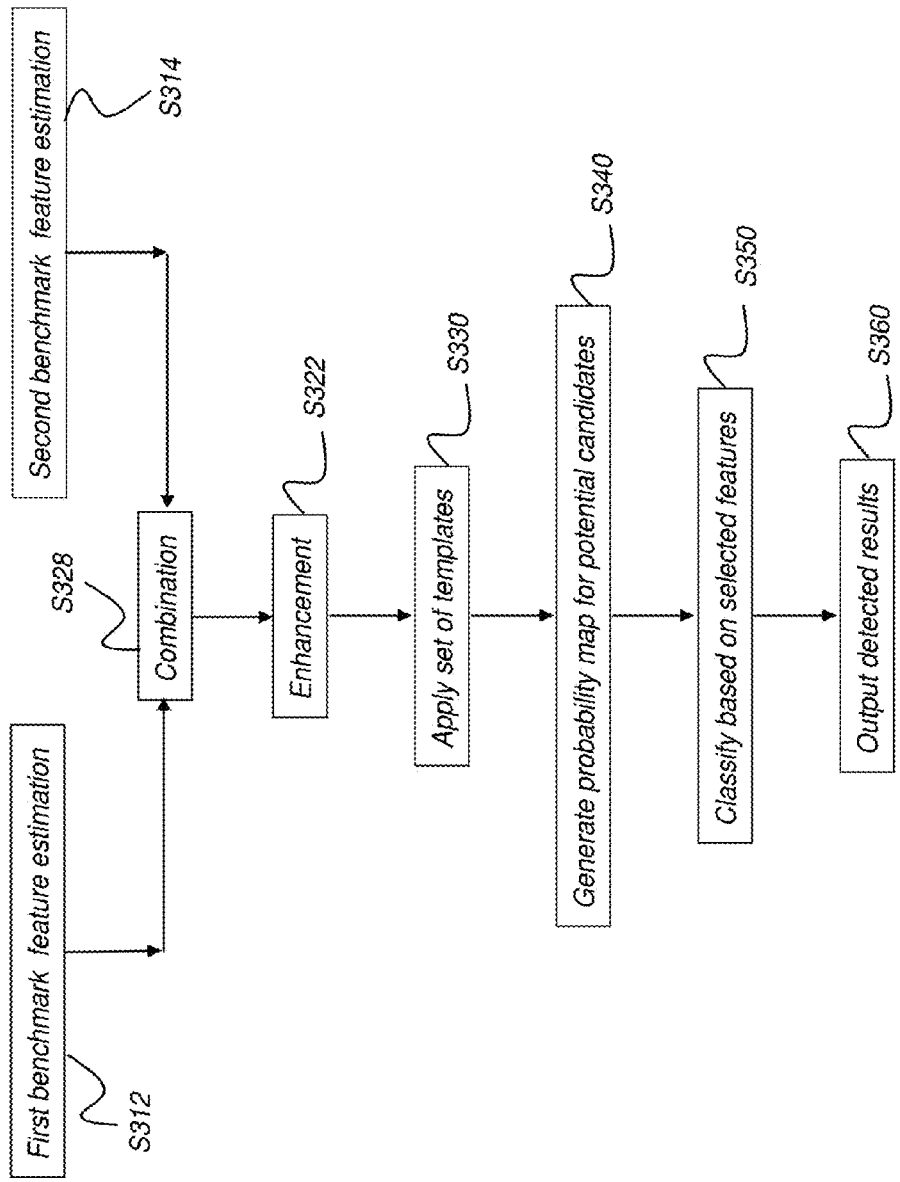
FIG. 15 is a logic flow diagram that shows an alternate sequence that combines first order estimation for two benchmark features with template application.

The logic flow diagram of FIG. 15 shows an alternate sequence that combines first order estimation for two benchmark features with template application. A first benchmark feature estimation step S312 analyzes the x-ray image data to estimate the location of a benchmark feature, such as the aortic arch or other feature. An optional second benchmark feature estimation step S314 operates similarly, analyzing the x-ray image data for the location of a second benchmark feature, such as one or more ribs or rib edges, trachea, tubing within the trachea, spine, or other suitable features for positional reference. A combination step S328 then combines information obtained from benchmark feature estimation steps S312 and S314, correlating the position data to help provide useful information for template application. An optional enhancement step S322 then enhances image content in preparation for template application. Enhancement step S322 may, for example, generate a binary image 24 (FIG. 13C) that is used with a template 28 in a template application step S330. A probability map generation step S340 and classification step S350 evaluate template matching results and help to identify the most accurate results according to patient anatomy. An output step S360 then records and displays results from this carina detection sequence, as shown by a marker 30 in an image 26 in FIG. 13D.

Figure 16B:
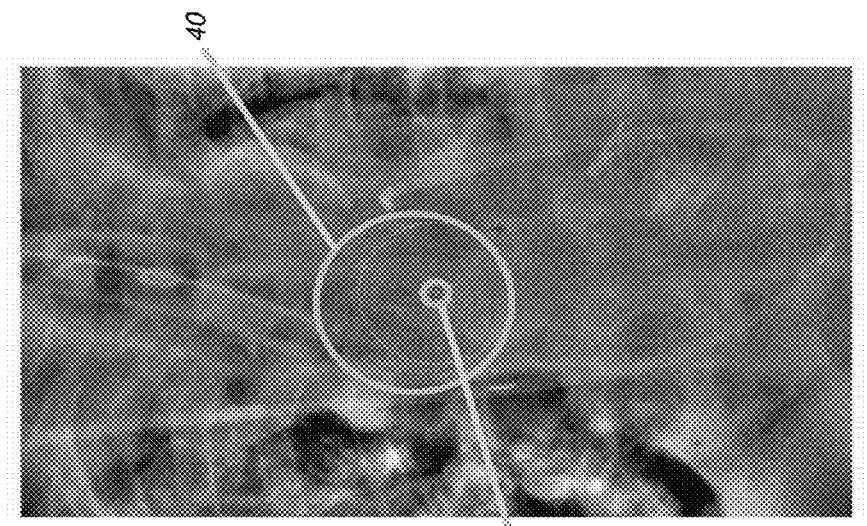
FIGS. 16A-16D illustrate a method of at least one embodiment in accordance with the present disclosure.
Figure 16A:
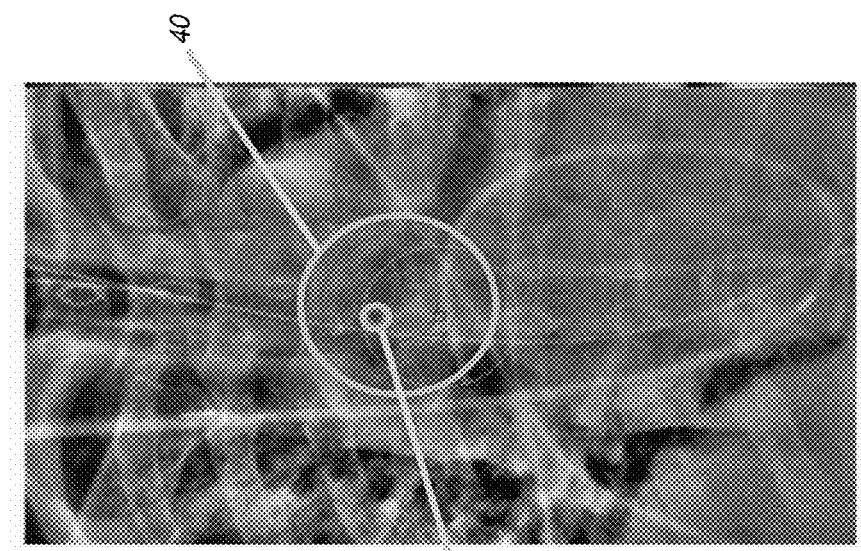
Figure 16C:
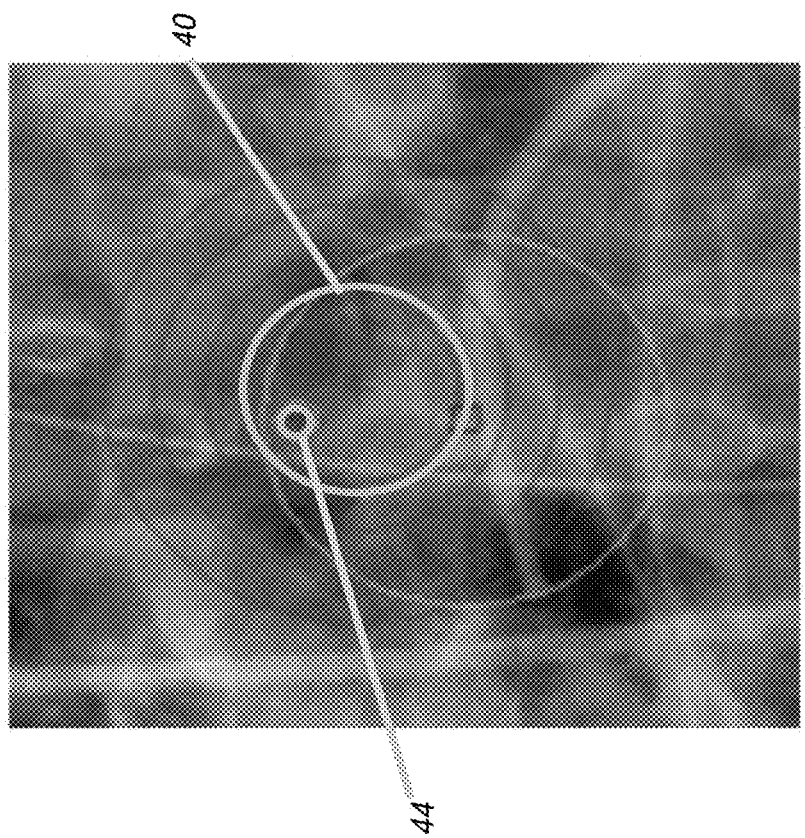
Figure 16D:
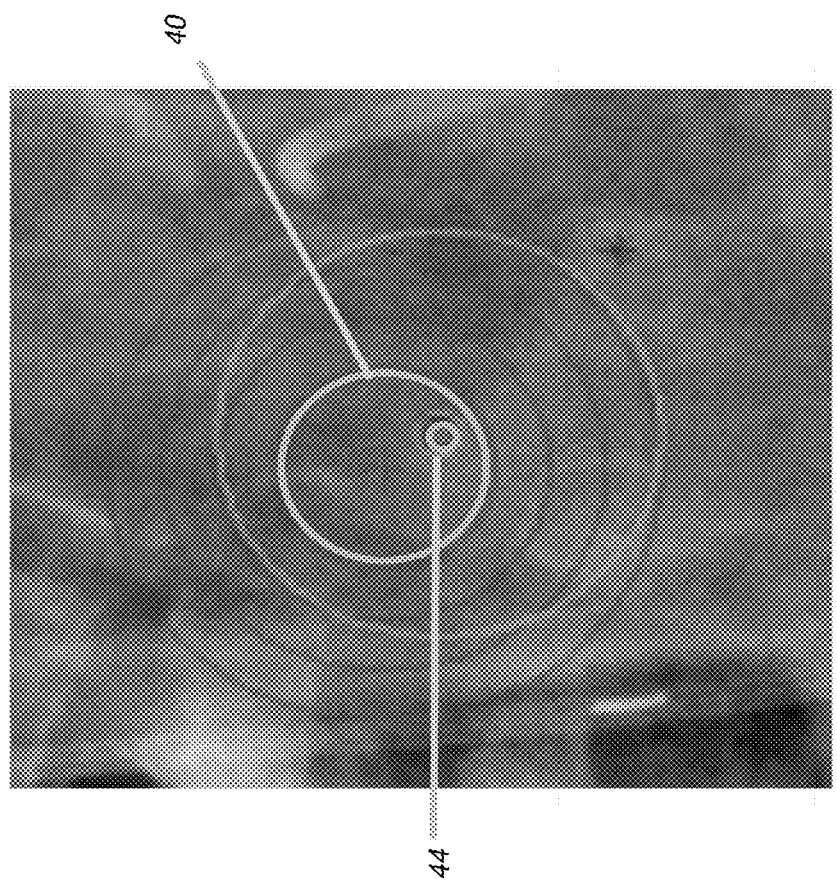

Embodiments of the present disclosure provide carina detection that closely matches that provided by a radiologist. In FIGS. 16A and 16B, a circle 40 is centered about the actual carina location, to highlight this location as identified by a radiologist. A second circle 44 highlights the location of the carina as detected using the combined anatomy benchmark and template matching sequence according to the present disclosure. Similar highlighting markup is provided in FIGS. 16C and 16D.

Figure 17:
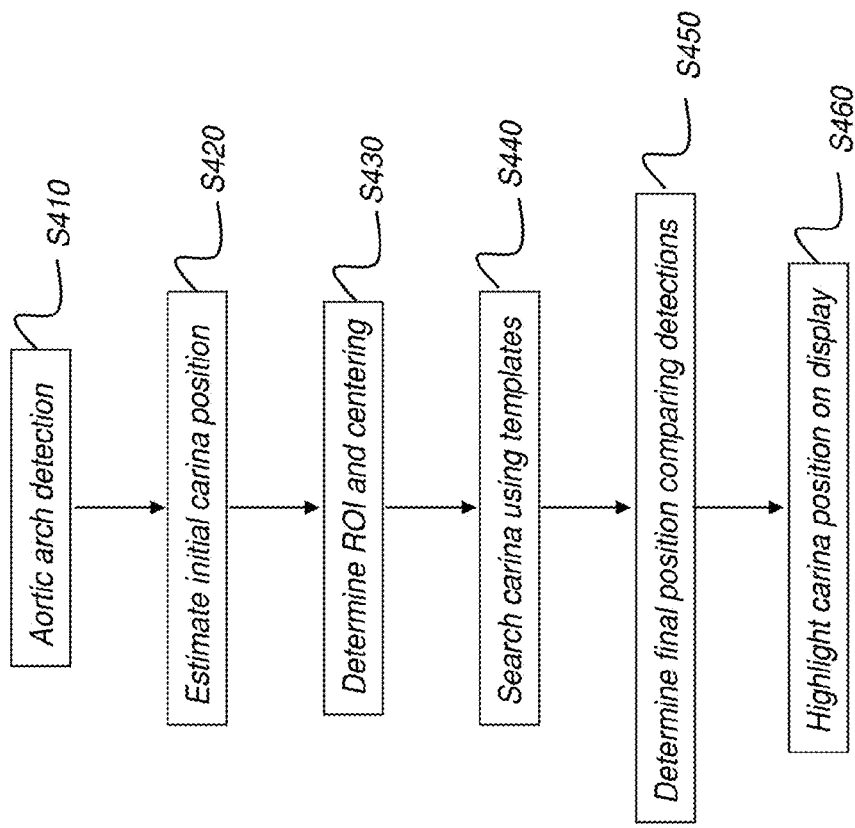
FIG. 17 shows a flowchart describing an alternate method that uses aortic arch detection.

FIG. 17 is a logic flow diagram that shows the steps used in carina detection using template matching combined with the aortic-arch based carina estimation. Following an aortic arch detection step S410, an estimate step S420 estimates the carina position. In an ROI centering step S430, the ROI is calculated, centered about the estimated carina location. In a search step S440, templates are used to search for the carina within the ROI. A final step S450 determines the position of the carina according to both the aortic arch and template match positions. The carina location is highlighted in a display step S460. The estimation step S420 can be executed using an alternative approach, such as, using the relationship between the position of the carina or aortic arch and the relative positions of ribs. For example, it can be observed that the aortic arch is located between the $3^{rd}$ and $5^{th}$ ribs in the lung. This additional information can be also used to modify the detected location of the aortic arch or the estimated carina location based on the aortic arch, particularly if these locations are determined to be poorly estimated based on their positions relative to the rib structures. Templates used for template matching can be generated using methods well known in the imaging arts; often, templates are generated using a database of images for which particular structures have been identified. Templates can also be generated using geometric structures that represent relationships between anatomical structures, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the method of the present invention can be employed with digital image data from a radiological image that is obtained directly from a digital radiography (DR) sensor or may operate using image data that was obtained from scanned film or from scanning a computed radiography (CR) cassette. Embodiments of the present invention can also be used for detecting anatomical structures in other types of diagnostic images. Various types of supplemental image processing may be used in conjunction with processing and methods of the present invention, in order to heighten detection accuracy for various anatomical structures, such as contrast enhancement for example. Additional image processing can be used to position the carina at the center of a Region of Interest (ROI), for example, as well as to highlight or add contrast to the local area around the carina. Alternate methods for detecting the aortic arch include use of a template, such as a Haar-like template, for example.

Thus, what is provided is a method for detecting an anatomical structure in a digital radiography image using detection of one or more benchmark features in the image.

What is claimed is:

1. A method for estimating the location of an anatomical structure in an x-ray image of a patient, comprising:
    obtaining the x-ray data in digital format;
    estimating the location of at least a first benchmark feature within the x-ray image according to the obtained digital x-ray data;
    defining a region of interest within the image according to the estimated location of at least the first benchmark feature;
    searching the region of interest for the anatomical structure using a template; and
    highlighting the location of the anatomical structure on a display according to the template searching results.

2. The method of claim 1 further comprising estimating the location of a second benchmark feature within the x-ray image and combining estimation information from the at least the first and second benchmark features to define the region of interest.

3. The method of claim 2 wherein detecting the second benchmark feature further comprises segmenting lungs within the diagnostic image.

4. The method of claim 1 wherein the first benchmark feature comprises a trachea or a rib.

5. The method of claim 1 wherein the first benchmark feature is a tube inserted into the trachea.

6. The method of claim 1 wherein the first benchmark feature is the spine of the patient.

7. The method of claim 1 wherein the first benchmark feature is substantially linear.

8. The method of claim 1 wherein the first benchmark feature comprises an aortic arch of the patient.

9. The method of claim 8 further comprising applying a Canny edge detection algorithm.

10. The method of claim 8 further comprising highlighting the aortic arch on a display.

11. A method for estimating the location of an anatomical structure in a diagnostic image of a patient, comprising:
    obtaining the x-ray data in digital format;
    detecting a first benchmark feature within the x-ray image;
    detecting a second benchmark feature within the x-ray image;
    locating an intersection between a first line that extends along the length of the first benchmark feature and a second line that extends through a central point related to the curvature of the second benchmark feature and that intersects with the first line at an angle that is within a predetermined range of angles;
    identifying the location of the anatomical structure relative to the intersection;
    defining a region of interest according to the identified location;
    searching the defined region of interest using a template; and
    highlighting the location of the anatomical structure on a display according to the template searching results.

12. A method for estimating the location of an anatomical structure in an x-ray image of a patient, comprising:
    obtaining the x-ray data in digital format;
    estimating a first location of a first benchmark feature within the x-ray image according to the obtained digital x-ray data;
    estimating a second location of a second benchmark feature within the x-ray image according to the obtained digital x-ray data;
    defining a region of interest within the image according to the estimated first and second benchmark feature locations;
    searching the region of interest for the anatomical structure using a template; and
    highlighting the location of the anatomical structure on a display according to the template searching results.

13. The method of claim 12 wherein at least one of the first and second benchmark features are taken from the group consisting of an aortic arch, a trachea, a rib, a tube inserted into the trachea, and the spine of the patient.

14. The method of claim 12 wherein estimating the first or second locations further comprises segmenting lungs within the x-ray image.

15. The method of claim 12 wherein the anatomical structure is the carina.

16. A method for estimating the location of the carina in a chest x-ray image of a patient, comprising:

obtaining the chest x-ray data in digital format;
estimating a first location of an aortic arch as a first benchmark feature within the x-ray image according to the obtained digital x-ray data;
estimating a second location of a second benchmark feature within the x-ray image according to the obtained digital x-ray data;
defining a region of interest within the image according to the estimated first and second benchmark feature locations;
searching the region of interest for the carina using a template; and
highlighting the location of the carina on a display according to the template searching results.

* * * * *